Nov. 11, 1958     D. F. WILCOX     2,860,057
PROCESS OF PREPARING EVAPORATED MILK
Filed Sept. 29, 1955
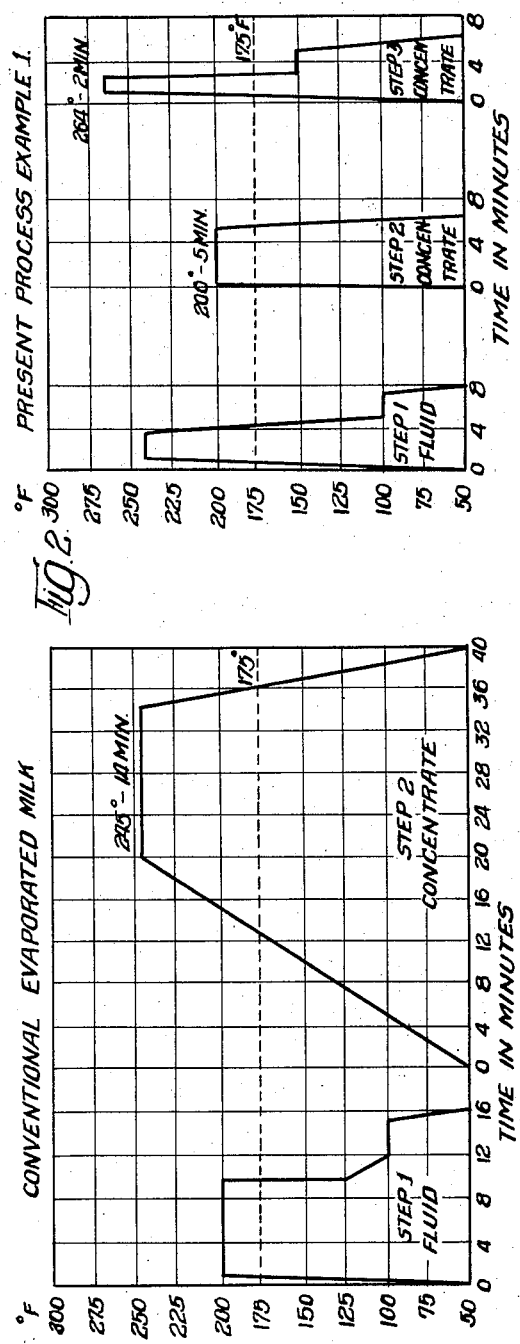
INVENTOR.
Donald F. Wilcox,
BY United States Patent Office 2,860,057
Patented Nov. 11, 1958

2,860,057

PROCESS OF PREPARING EVAPORATED MILK

Donald F. Wilcox, Mill Valley, Calif., assignor to Foremost Dairies, Inc., San Francisco, Calif., a corporation of New York Application September 29, 1955, Serial No. 537,402

10 Claims. (Cl. 99—212)

This invention relates to a method for the preparation of evaporated milk products of improved color and flavor and more specifically to a high-temperature-short-time sterilization process for the preparation of sterilized milk products of greater than normal concentration.

Conventionally, concentrated milk products such as evaporated milk are sterilized by the so-called long-time-low-temperature sterilization process wherein the product to be sterilized is sealed in a can and thereafter subjected to temperatures ranging from approximately 240° F. to 250° F. for from approximately 10 to 20 minutes. In addition to the sterilization step itself, it is common practice within the evaporated milk industry to forewarm the fluid milk prior to concentration in order to impart to the concentrated milk the desired degree of stability to the heat of sterilization. The amount of heat imparted to the fluid milk during the forewarming treatment varies considerably between different milks and different milk shed areas and it also is dependent upon the amount of viscosity desired in the finished product. In some cases it is necessary to add such "stabilizing" salts as sodium citrate, disodium phosphate and the like, while in other instances "destabilizing" salts such as calcium chloride may be added to effect the required heat stability, thereby preventing coagulation or curdling during sterilization. In any event the degree of stabilization required to prevent coagulation and yet obtain optimum viscosity is found by sterilizing pilot samples containing varying amounts of the necessary salts or varying ratios of over-stabilized milk to under-stabilized milk as described by Parks in U. S. Patent No. 2,553,783.

Although these procedures have been well adapted by the evaporated milk industry to the attainment of such desirable characteristics as optimum viscosity, resistance to fat separation and storage stability, it is a well-recognized fact that conventional processing imparts an undesirable degree of color and caramelized or cooked flavor to the finished product.

The efforts of numerous investigations to overcome these defects by means of high-temperature-short-time sterilization treatments have been thwarted by the tendency of products sterilized at higher temperatures and for shorter periods of time to age thicken. To a lesser degree a second defect is encountered in that concentrated milk products sterilized by the high-temperature-short-time process fail to develop viscosity sufficient to inhibit serious fat separation during storage of the finished product.

For example, Ball, in his U. S. Patent No. 2,087,962, on "Method of Controlling Viscosity in Evaporated Milk," describes a high-temperature-short-time sterilization process wherein he prepares a product containing from 29% to 35% total solids in order to obtain sufficient viscosity to satisfactorily inhibit fat separation which would otherwise limit the commercial acceptability of the high-temperature-short-time sterilized product regardless of its improved color and flavor qualities. Irrespective of this apparent advancement in the field of high-temperature-short-time sterilization of concentrated milk products, Ball makes no provision for controlling the aforementioned age thickening or gelation defect, hence products produced by this process are limited to a storage life of from a few weeks to not more than approximately three months.

Stewart et al. have described one method for overcoming the problems of age-thickening and fat separation in pending application Serial No. 389,151, filed in the United States Patent Office October 29, 1953, on "Process for Preparing Sterile Evaporated Milk" which utilizes a preheat treatment of the milk while in an over-concentrated state, subsequent dilution to the final desired composition, and sterilization by a high-temperature-short-time process. This application teaches the additional processing step of sterile homogenizing following sterilization whereby an optimum dispersion of the fat is attained thereby obviating the necessity for developing an excessively high degree of viscosity in the finished evaporated milk. Although this method satisfactorily prolongs the onset of age thickening or gelation, it involves the disadvantages that evaporation to a concentration at least 5% greater than the desired final concentration is required.

The present invention relates to an improved high-temperature-short-time sterilization method for preparing sterilized concentrated milk, such as evaporated milk, with a minimum of cooked or caramelized flavors and brown color, while at the same time providing adequate storage life particularly with respect to resistance to age thickening. Whereas, the pending application of Stewart et al. teaches one method for accomplishing this end, its commercial application is oftentimes limited by increased costs occasioned by the over-concentration step, lack of adequate evaporating capacity and the like, the instant invention provides a method of controlling age thickening, which is not dependent upon concentration to a total solids content in excess of that desired in the finished product.

This invention is based upon the discovery that adequate stability against age thickening during storage can be effected without resorting to over-concentration by properly proportioning the total heat treatment given to the concentrated product by the forewarming treatment of the fluid milk, preheat treatment of the concentrate, and the sterilization steps. The heat treatment may be increased in any one of the three steps independently in order to bring about the desired storage stability in the resulting milk product. This process has the further added advantage of easier product handling during processing.

I have shown diagrammatically in the accompanying drawings the heating steps for the production of evaporated milk by standard process and by means of three different variations of the present process which will be described in detail hereinafter.

In the drawings—

Figure 1 shows diagrammatically the usual present commercial process;

Figure 2 shows one process according to the present invention; and

Figures 3 and 4 show modifications of the present process.

In carrying out this invention it is contemplated that the fluid milk be forewarmed to minimized any tendency of the concentrated product to undergo coagulation during sterilization. The forewarming step is desirable for yet another more subtle reason in that with certain milks this treatment has been found to contribute significantly to the sought-for resistance to gelation.

Following said forewarming treatment the fluid milk is concentrated by conventional means to substantially the final desired concentration, after which it is subjected to a preheat treatment within the range from approximately 180° F. for ten minutes to approximately 250° F. for one minute. Although the exact changes brought about by this treatment are unknown, it is necessary apparently to induce those physico-chemical conditions which permit a high degree of resistance to gelation when high-temperature-short-time sterilization conditions are used as herein described. It is the further teaching of this invention that the concentrated milk may be cooled subsequent to the preheat treatment and prior to the final sterilization step to a temperature of below at least substantially 150° F. and preferably to a temperature within the range of from 32° F. to 100° F.

Having effected a partial stabilization against age thickening by this preheat treatment of the concentrated milk at substantially its desired final concentration, the concentrated product is thereafter subjected to high-temperature-short-time sterilization conditions so adjusted with respect to time and temperature as to bring about the additional necessary heat induced physico-chemical changes productive of the desired resistance to age thickening. This is accomplished by utilizing a period of time considerably in excess of the minimum necessary to produce an $F_0$ value of at least substantially 5, and in all instances it is contemplated that a temperature be selected which will allow sterilization times of at least approximately one minute and not more than approximately three minutes.

It is to be understood that the sterilization step can be carried out in accordance with the preference of the operator with respect to the particular high-temperature-short-time sterilization system used since such sterilization can be conducted either in the can or prior to canning. In the latter instance the sterilized product may be canned using any suitable methods and means of aseptic canning. If the aseptic canning method is employed, it is preferable to homogenize under sterile conditions subsequent to the sterilization step as homogenization at this point materially lessens the agglomeration of fat particles which inevitably occurs when homogenization precedes the sterilization step, thereby substantially contributing to the storage stability of the fat emulsion. In either event it is necessary that time and temperature be adjusted to produce an $F_0$ value of at least substantially 5 in the manner described above.

The term $F_0$ is well known and standardized in the canning art and can be defined as that relation of time and temperature expressed in the formula:

$$F_0 = m \times \text{antilog} \frac{T-250}{Z}$$

where:
- $Z = 18$
- $m =$ minutes
- $T =$ temperature, ° F.

From the above formula it will be seen that the sterilization value ($F_0$) is a logarithmic function of time and temperature, the time required for sterilization increasing ten-fold with each decrease of 18° F. in temperature. For instance, the following times and temperatures will give a sterilization value ($F_0$) of 10:

| | |
|---|---|
| 232° F | 100 minutes. |
| 250° F | 10 minutes. |
| 268° F | 1 minute. |
| 286° F | 0.10 minute or 6 seconds. |
| 304° F | 0.01 minute or 0.6 second. |

This mathematical method for calculating thermo-processing times for canned foods, as developed by Dr. Charles O. Ball, is described in "Bulletin of the National Research Council," volume 7, part 1, No. 37, October 1923. At the time this bulletin was published, Dr. Ball was employed by the Research Laboratory of the National Canners Association, Washington, D. C.

Dr. Ball's calculations were subsequently simplified and it has now become quite customary to use the term $F_0$ value which is derived from Dr. Ball's calculations and in which his so-called "z" value is assumed to be equal to 18. This is explained in an article by C. R. Stumbo, of the Food Machinery Corporation, entitled "Bacteriological Considerations Relating to Process Evaluation," published in Food Technology, volume 2, No. 2, April 1948.

By way of illustration and not by way of limitation typical examples of the present process as applied to the manufacture of evaporated milk are as indicated below.

As a first example, shown diagrammatically in Figure 2 of the drawing, whole fluid milk was forewarmed at a temperature of 240° F. for approximately two minutes as it entered the evaporator where it was concentrated to substantially the final desired concentration or approximately 26% total solids. The concentrated product then was preheated to 200° F. for five minutes and cooled to 40° F. at which point it was standardized to the normal evaporated milk composition of 7.9% fat and 25.9% total solids.

The standardized product then was processed continuously through a preheater where it was brought to a temperature of 180° F.; a high velocity sterilizing heater and holding tube in which the temperature is raised to 264° F. and held for a period of two minutes; a tubular cooler wherein the temperature is reduced to 150° F.; an homogenizer operating at 4000 pounds per square inch pressure and a final tubular cooler which lowers the temperature to 75° F. prior to aseptic canning.

The process described above represents effective conditions for the production of evaporated milk from average milk supplies. However, it should be pointed out that some variations may be desirable, depending upon variations in the composition of the milk during different seasons of the year and between different milk shed areas. In addition, it should be recognized that some variations within the limits herein described may be made if one desires to sterilize concentrated milk products containing more than approximately 26% total solids by the high-temperature-short-time sterilization process. Such variations as will be desired involve primarily variations in the temperatures and times of both the preheat treatment and the sterilization step. Concentrated milk containing more than 26% solids, or manufactured during periods or in localities when the composition of the milk is such that it is inherently more unstable, may be processed in such fashion as to impart a greater amount of heat to the finished product in the controlled manner herein described, in order that the sought-for advantages as to color and flavor are obtained. In such cases the desired stability to age thickening can be obtained selecting longer preheating periods, such as, for example, 185° F. for ten minutes, and selecting a somewhat lower sterilization temperature together with a correspondingly longer sterilization period as required to produce the desired $F_0$ value which in all cases must be above at least substantially an $F_0$ of 5. Such a treatment is shown diagrammatically in Figure 3.

It is not uncommon to encounter unusually favorable milk supplies for the manufacture of this product. With such milk supplies another type of modification of the process may be made, as illustrated in Figure 4, in which the same three steps in the process are employed but in which the preheat treatment of the concentrate is done at a higher temperature for a shorter time, for example, 250° F. for one minute, followed by a sterilization step utilizing the temperature as high as 270° F. but for a duration of only about one minute.

Although the term "evaporated milk" has been used in the description of this invention, it is to be understood that this terminology in no way limits the invention disclosed herein. It is to be understood that the teachings of this invention are applicable to concentrated milk products either in the presence or absence of fat and which range in concentration from approximately 16% to 35% total solids. It is intended also that one may optionally modify the mineral or other milk solids content of the milk in order to meet the special requirements of certain dietary products, mainly low sodium evaporated milk or evaporated milk product. Also, it is to be recognized that when it is desired to include fat as one of the components of the product, this component may be supplied either in the form of butterfat, other animal fats, or vegetable fat.

As before indicated, the product of this invention is new and has unusual merit because it possesses for the first time a high degree of stability against gelation in storage because of changes brought about in the proteins and salts and, at the same time, a very low level of cooked flavor and of color from caramelizing fragmentation of lactose produced by heat treatment. In color and flavor the product is easily distinguishable from conventional evaporated milk. The degree of cooked flavor parallels closely the degree of color imparted to it by the processing conditions. The amount of color induced in the product is a dependable indicator of flavor. The best conventional evaporated milk possesses color from caramelizing fragmentation of the lactose from processing 400 to 600% greater than that of this product. This product can be conveniently compared in color with conventional evaporated milk in the following manner:

Use the starting whole raw milk as a color standard. Place a portion of the raw fluid milk in a convenient sized graduate. Place an equal portion of the product of this invention in an identical graduate after first diluting to the solids content of the fluid raw milk. Add to an identical graduate a like portion of a conventional evaporated milk from the same raw milk diluted in the same manner with distilled water. Now add stepwise with mixing fluid skim milk to the two samples of evaporated milk until the intensity of color of each matches that of the fluid milk, when compared in north skylight or in equivalent artificial light. Record the final volume of the two evaporated milks resulting from the dilution with the fluid skim milk. The color ratio is calculated by dividing the volume of the original 1:1 water dilution of the evaporated milk into the final matching volume. Typical results obtained by means of this test are:

"Analytical Chemistry," volume 26 (1954), pages 1923–1927, and by A. Van Kreveld and G. Van Minnen, "The Netherlands Milk and Dairy Journal," 1955, volume 9, Number 1, pages 1–29. My procedure differs from those described above in the following ways: (1) The resin Chempro C–20 was wet screened to select particles from 0.0093 to 0.0329" in diameter, then dried to constant weight at 35° C. (2) Three grams of the dried resin was employed in each analysis. After exposing the three gram quantity of the resin to the milk being tested the resin is separated from the product and the equilibrium load on the resin is determined for the several ions with especial attention given to the calcium and magnesium ion loads.

Illustrative of the kinds of changes encountered in this test, I found the following results:

| Sample | Milliequivalents of $Ca^{++}$ and $Mg^{++}$ on 3 grams of Equilibrated Resin | | |
|---|---|---|---|
| | $Ca^{++}$ | $Mg^{++}$ | $Ca^{++}$ and $Mg^{++}$ |
| Raw Milk | 6.56 | 1.08 | 7.64 |
| Product of This Process | 3.96 | 0.76 | 4.72 |
| Regular Evaporated Milk | 3.90 | 0.73 | 4.63 |
| Product of This Process Diluted to Raw Milk Concentration | 5.92 | 1.04 | 6.96 |
| Regular Evaporated Milk Diluted to Raw Milk Concentration | 5.68 | 1.00 | 6.68 |

It is noted that the equilibrium resin loads of $Ca^{++}$ and $Mg^{++}$ in the product of this process approached those of regular evaporated milk and differ noticeably from those values obtained when the resin is equilibrated against the raw milk. Thus, it is seen that the new process accomplishes a reduction in the ionic concentrations of calcium and magnesium commensurate with a high degree of resistance to gelation in the concentrated sterilized product.

The data relating to the ionic concentrations in the diluted products were obtained by diluting the finished sterilized concentrated milks with distilled water to the total solids content of the original standardized raw milk. The thus diluted milk products were held for approximately 20 hours at about 35° F., then warmed to room temperature for approximately four hours before determining the resin equilibrium load in the same man-

| Product of this Process, Diluted 1:1 with Water | | | | Conventional Evaporated Milk, Diluted 1:1 with Water | | | |
|---|---|---|---|---|---|---|---|
| Sample | Volume Before Dilution, ml. | Volume After Dil. to Match Color Depth of Fluid Milk, ml. | Ratio of Vol. | Sample | Volume Before Dilution, ml. | Volume After Dil. to Match Color Depth of Fluid Milk, ml. | Ratio of Vol. |
| 1 | 20 | 30 | 1.5 | 1 | 10 | 87 | 8.7 |
| 2 | 20 | 35 | 1.75 | 2 | 10 | 110 | 11.0 |

The results in the table illustrate clearly the marked difference in color possessed by the two products. There is clearly indicated a sixfold difference in color between the two products. The results also show that the color of the product of this invention is very close to that of the starting fluid milk.

I find it helpful to evaluate the degrees of change in the final product of certain metal ion concentrations and in the proteins which are brought about by means of my processing procedure. For this purpose I have employed an ion exchange resin as an indicator of the calcium and magnesium ion concentrations in my final product as well as in the starting milk. I compare these values with those values for conventional evaporated milk obtained by the same resin indicator technique. To perform this test I follow in most essential details the techniques described by Christiansen, Jenness, and Coulter, ner as with the raw milk.

Upon comparing the calcium and magnesium ion concentrations in the thus diluted conventional evaporated milk with the product resulting from the present process, likewise diluted, a distinct difference in the degree of ionic reequilibration is evident. This is taken as conclusive evidence demonstrating that the present process yields a product in which the irreversible physico-chemical changes, normally associated with conventional sterilization procedures, are prevented or controlled so as to obtain a milk product in which the natural milk characteristics are retained to an optimum degree.

The degree of change brought about in the albumin and globulin is determined essentially by the Harland-Ashworth procedure as published in "Food Research," volume 12, pages 247–251, but adapted to a Cenco Sheard-Sanford photometer in place of the Evelyn.

By appropriate analysis of the starting milk and of the finished product the proportion of the whey protein nitrogen that is denatured is determined. Typical samples of product produced by this process are found to have 90% or more of the whey protein nitrogen denatured.

The degree of the desirable changes brought about in the casein, changes which are associated with break-up or fragmentation of the casein, are measurable by means of a curd-tension test. "The American Dairy Science Association Method for Curd Tension Determination" is used as presented in the "Laboratory Manual of the Milk Industry Foundation," 1949 edition, chapter 27, with certain modifications: Under "Apparatus, item 2," the pipette is made to deliver 100 ml. in 4 to 5 seconds. The curd tension meter employed is that of Submarine Signal Company apparatus and Serial Number 728C211. Under "Procedure, item 5," the reading to be recorded is the value obtained after the knife has penetrated the surface and settled down to a steady reading.

Evaporated milk to be tested is first diluted with water to a total solids content of 12.5% or to a M. S. N. F. content of 8.50%. It is found that the curd tension of this product is reduced to values well below 5 grams, and usually as low as 2 grams, which reflects the very extensive change in casein brought about by the special processing peculiar to this method.

While certain preferred methods of carrying out the process have been described in detail, it is intended that these are given by way of illustration only, and therefore such variations as are necessary to take care of different conditions and requirements are contemplated as falling within the spirit and scope of the appended claims.

What is claimed is:

1. The process of producing high-temperature-short-time sterilized concentrated milk which comprises the steps of forewarming the fluid milk prior to concentration, concentrating said milk to a solids content of between approximately 16% and 35% total solids, subjecting the said concentrated milk to a preheat treatment within the temperature time range of approximately 180° F. for a period of approximately ten minutes to approximately 250° F. for a period of approximately one minute, then cooling the thus heated concentrate to a temperature of below approximately 150° F., and sterilizing the concentrate thus produced by heating the same for a period of time of at least approximately one minute and not more than three minutes and at a temperature productive of an $F_0$ value of at least substantially 5.

2. The process defined in claim 1 further characterized in that the sterilized product is homogenized prior to sterilization and aseptically canned.

3. The process defined in claim 1 further characterized in that the product is homogenized subsequent to the sterilization step and aseptically canned.

4. The process defined in claim 1 further characterized in that sterilization is accomplished after the homogenized product is canned.

5. The process of producing high-temperature-short-time sterilized concentrated milk which comprises the steps of forewarming the fluid milk prior to concentration, concentrating said milk to a solids content of between approximately 16% and 35% total solids, subjecting the said concentrated milk to a preheat treatment within the temperature time range of approximately 180° F. for a period of approximately ten minutes to approximately 250° F. for a period of approximately one minute, and sterilizing the concentrate thus produced by heating the same for a period of time of at least approximately one minute and not more than three minutes and at a temperature productive of an $F_0$ value of at least substantially 5.

6. The process defined in claim 5 further characterized in that the sterilized product is homogenized prior to sterilization and aseptically canned.

7. The process defined in claim 5 further characterized in that the product is homogenized subsequent to the sterilization step and aseptically canned.

8. The process defined in claim 5 further characterized in that sterilization is accomplished after the homogenized product is canned.

9. A high-temperature, short-time sterilized canned liquid product comprising solids derived from milk and having a concentration of between substantially 16% and 35%, said total solids content containing from 1% to 50% fat, in which the casein complexes are fragmented to that degree which removes from the product any substantial tendency, derived from the casein, to age thicken throughout a period of approximately nine months when stored under normal storage conditions, and in which the albumen and globulin present are denatured so as to exist to a substantial degree in an hydrophobic form, and in which the lactose molecules present are substantially free from caramelizing fragmentation, whereby said product possesses substantial resistance to age thickening and is substantially free of cooked flavor and brown color.

10. A high-temperature, short-time sterilized canned liquid product comprising solids derived from milk, and having a concentration of between 16% and 35% solids, said total solids content containing from 1% to 50% fat, in which the casein complexes are fragmented to that degree which removes from the product any substantial tendency, derived from the casein, to age thicken throughout a period of approximately nine months when stored under normal storage conditions, and in which the albumen and globulin present are denatured so as to exist to a substantial degree in an hydrophobic form, and in which the lactose molecules present are substantially free of caramelizing fragmentation, said product having a calcium and magnesium ion concentration which stabilizes the fragmented casein complex, whereby said product possesses substantial resistance to age thickening and is substantially free of cooked flavor and brown color.

References Cited in the file of this patent

UNITED STATES PATENTS

| | | |
|---|---|---|
| 2,388,103 | Whitaker et al. | Oct. 30, 1945 |
| 2,490,599 | Otting | Dec. 6, 1949 |
| 2,553,783 | Park | May 22, 1951 |

OTHER REFERENCES

Journal of Dairy Science, 26 (8), August 1943, pp. 761, 762.